United States Patent [19]

Chamberlin

[11] 3,998,533
[45] Dec. 21, 1976

[54] VIDEO FILM PROJECTOR

[76] Inventor: Earl Chamberlin, 1804 Mission, Santa Cruz, Calif. 95060

[22] Filed: Jan. 31, 1973

[21] Appl. No.: 328,244

[52] U.S. Cl. .................................. 352/184; 352/185
[51] Int. Cl.² ............................................ G03B 1/00
[58] Field of Search .................... 352/184, 185, 191

[56] References Cited
UNITED STATES PATENTS

| | | | |
|---|---|---|---|
| 1,244,920 | 10/1917 | Thomas | 352/184 X |
| 2,960,914 | 11/1960 | Rogers | 350/160 R |
| 3,554,635 | 1/1971 | Milliken | 352/185 X |

*Primary Examiner*—Monroe H. Hayes
*Attorney, Agent, or Firm*—Phillips, Moore, Weissenberger, Lempio & Strabala

[57] ABSTRACT

A video film projector has a pin registration transport mechanism which employs inherent spring means in a loop of film to advance the film, and a synchronizing shutter to inhibit projection of light during transport of the film. The shutter comprises a rotating arcuate member rotatable to interrupt a light path of the projector, and an eccentric spindle rotatable with the shutter member and adapted to engage the film to 'trigger' transport in synchronization with shuttering.

The projector also includes a unique film guide construction for self-threading of the projector, a co-axial film reel mounting and driving mechanism, and a film storage cartridge which includes a mechanism for retaining the free end of the film strip in proper orientation for self-threading of the projector.

6 Claims, 11 Drawing Figures

Fig. 1
Fig. 2
Fig. 3
Fig. 4
Fig. 5
Fig. 6

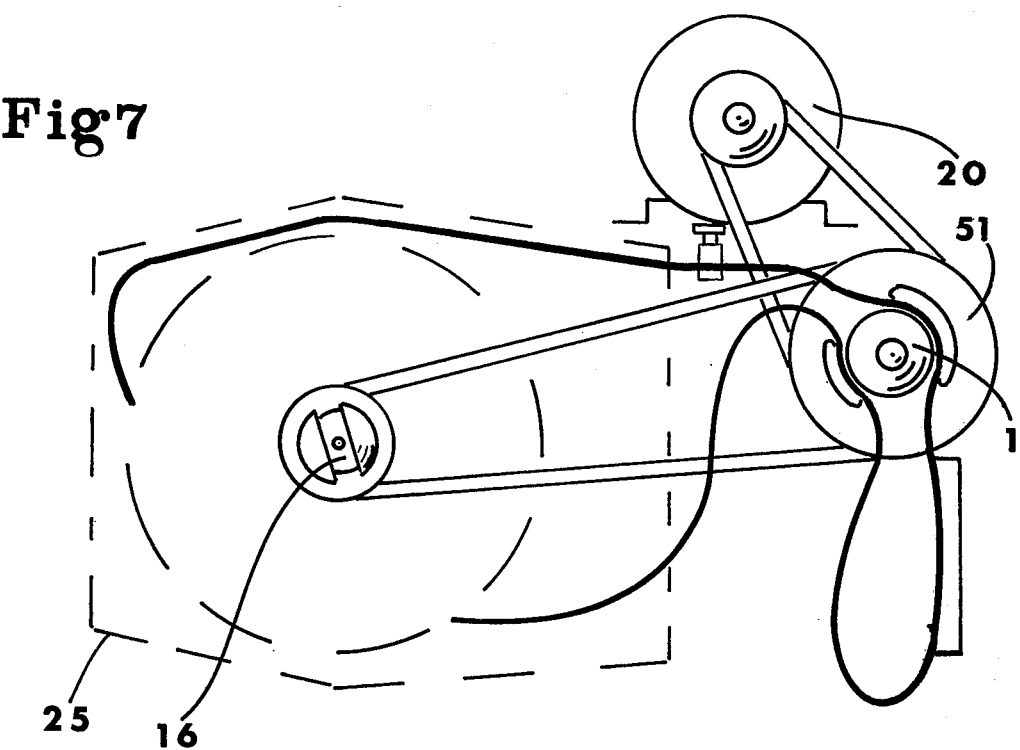
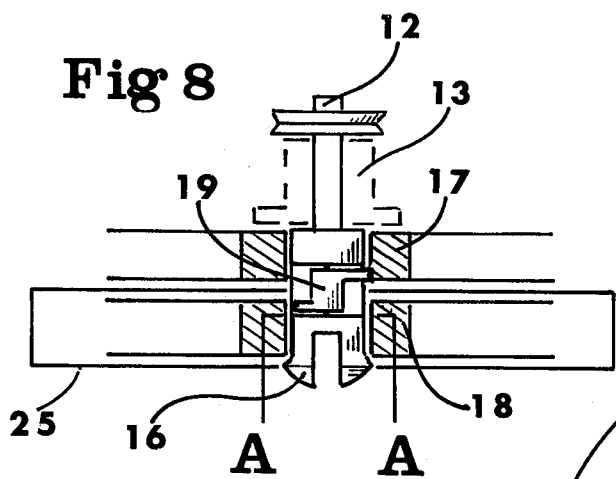
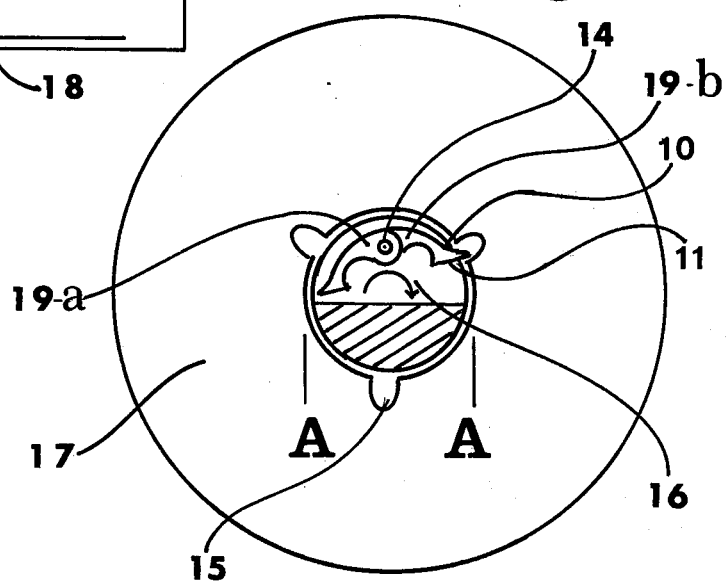

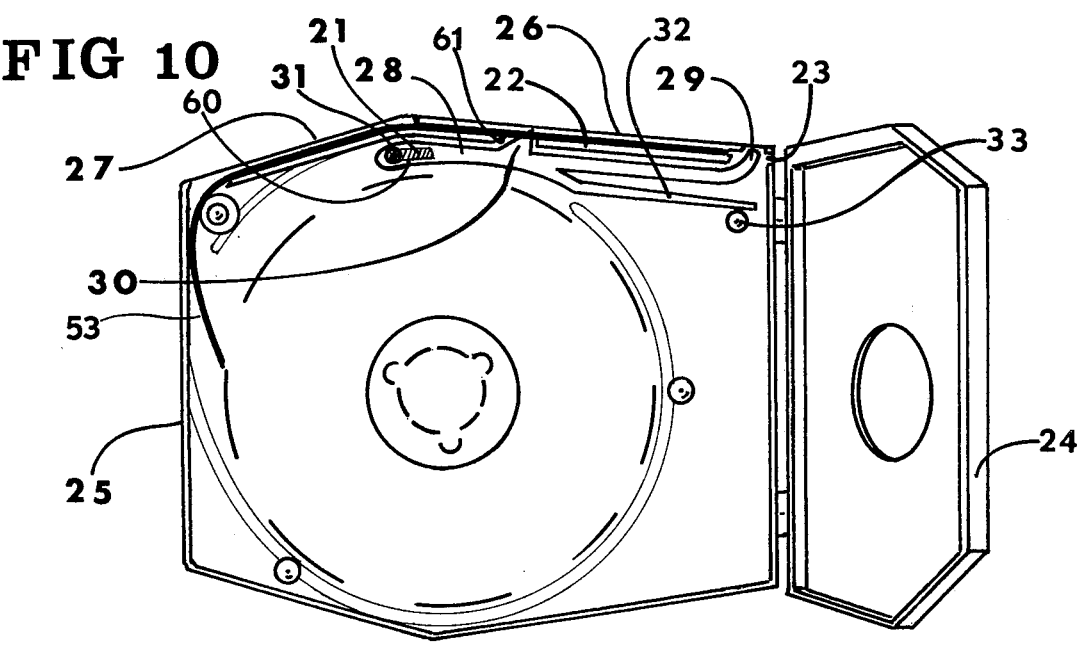
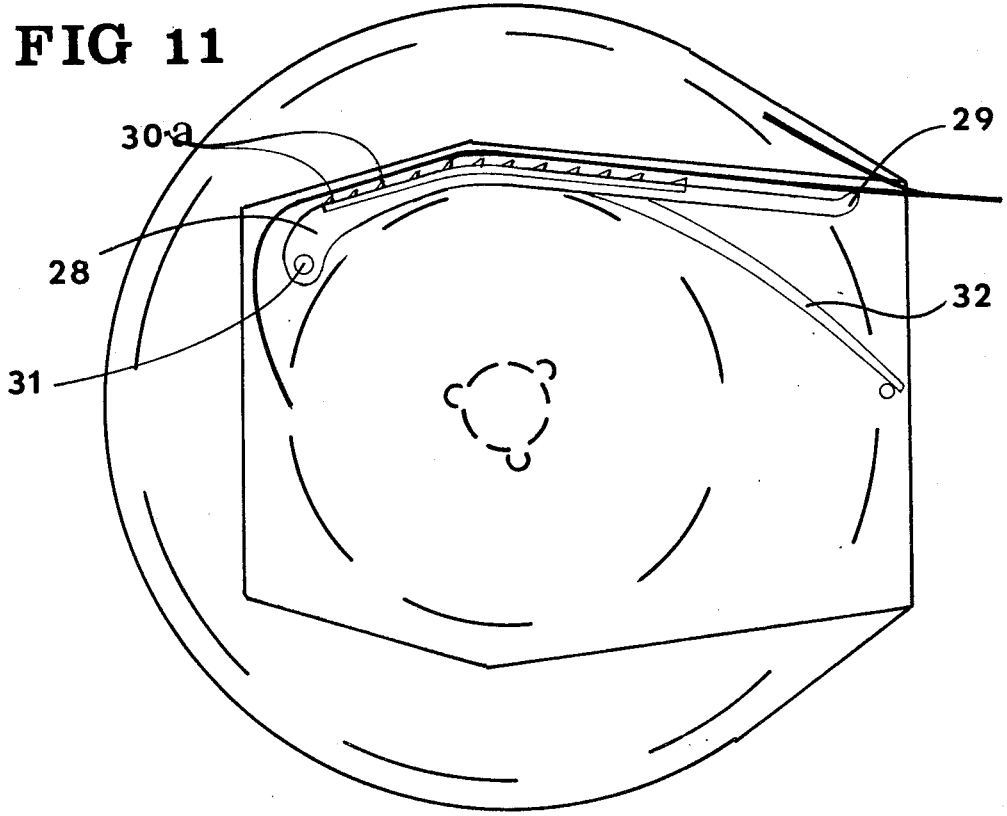

VIDEO FILM PROJECTOR

BACKGROUND OF THE INVENTION

This invention relates to an improved video film projector having a pin registration transport mechanism and a synchronizing shutter. Pin registration transport of a film strip is well known and comprises a small angled pin disposed in the gate of a projector to engage respective perforations in the edge of the film as it moves through the gate. The film strip is driven on both sides of the gate. After passing through the gate and over the registration pin, the film is looped around whereby driving of the film downstream of the gate will tend to pull it off the pin. Driving of the film upstream of the gate forms a loop whereby when the film is pulled off the pin will be advanced through the gate by the inherent spring tension of the upstream loop.

Although shuttering mechanisms have been provided in the past for pin registration transport systems, the prior art has not provided a means to synchronize the shutter and film transport at very slow, variable frame-per-second speeds.

This invention also relates to self-threading motion picture projectors which employ film storage cartridges which are adapted to snap onto appropriate mounting means on the projector whereby the film will be aligned for moving through the gate of the projector. In the past such cartridges have not been provided with satisfactory means for retaining the leading end of the film strip in proper orientation for feeding into the gate upon mounting of the cartridge on the projector. When such film is rewound, the leading end of the film is rewound into the cartridge whereupon it must be "fished" out of the cartridge prior to the next showing of the film. Such drawbacks are avoided by use of one endless loop cassette. However, professional equipment and experience are required to properly load film in such a cassette, making the use of such cassettes impracticable for homemovie use where it is desired to edit and splice film strips together.

This invention also relates to projector film take-up and rewind mechanisms.

BRIEF DESCRIPTION OF THE INVENTION

It is an object of the present invention to provide a video film projector having a pin registration transport mechanism and a shutter synchronized with the transport of the film at any frame-per-second speed.

Another object of the present invention is to provide a video film projector having a transport mechanism and a positively synchronized shutter, and having a constant transport time, but a variable film frame speed.

Another object of the present invention is to provide a simple take-up and rewind mechanism for a video film projector, utilizing a single spindle for both film reels.

Still another object of the present invention is to provide a simple drop-in loading film cartridge for a video film projector that eliminates handling of the film.

These and other objects and advantages are achieved by the present invention which provides a video film projector having a pin registration transport mechanism in which the projector includes a shutter comprising a circular segment which is rotatable to interrupt the light beam in the projector and which includes an eccentric spindle which is disposed to release the film from the registration pin upon interruption of the light beam by the shutter, for transport of the film.

In alternative embodiments, an electronic shutter may be employed with the transport mechanism of the present invention, which is actuated by a sensor member arranged to detect transport of film in the gate.

The projector also includes automatic pin guard means for guiding a film strip through the gate and over the registration pin during initial threading of the projector.

A drop-in loading film cartridge is also included which has a mechanism provided therein for retaining the leading end of the film in proper orientation for self-threading of the projector, after rewinding of the film. The mechanism comprises a spring biased sensor for sensing when the end of the film has been withdrawn into the cartridge, and a spring biased tooth, movable by the sensor to engage the leading end of the film when it has been withdrawn into the cartridge, and holding it for ready insertion into the projector upon the next showing of the film.

The projector also includes a single spindle for mounting both the film cartridge reel and a take-up reel and driving one or the other of the film cartridge reel and take-up reel upon change of direction of the spindle. A resilient double pawl is pivotally mounted internal of the spindle and adapted to engage notches provided in the film supply reel and take-up reel for alternative driving engagement thereof upon rotation of the spindle in first and second directions.

BRIEF DESCRIPTION OF THE DRAWINGS

In the drawings:

FIG. 1 is a schematic side view of one embodiment of the transport mechanism and shutter of the present invention, FIGS. 2 and 3 are schematic side views of a portion of another embodiment of the present invention, FIG. 4 is a schematic side view of a portion of another embodiment of the present invention, FIGS. 5 and 6 are schematic side views of a portion of another embodiment of the present invention, FIG. 7 is a schematic side view of a film drive and take-up mechanism of the present invention, FIG. 8 is a top sectional view of the take-up and rewind reel spindle mechanism of FIG. 7, FIG. 7 is a side sectional view of the take-up and rewind spindle shown in FIG. 7, FIG. 10 is a side view of a film reel cartridge of the present invention, and FIG. 11 is a side view of another embodiment of the cartridge shown in FIG. 10.

DESCRIPTION OF THE PREFERRED EMBODIMENTS

Figures 1, 2, 3, 4, 5, 6:
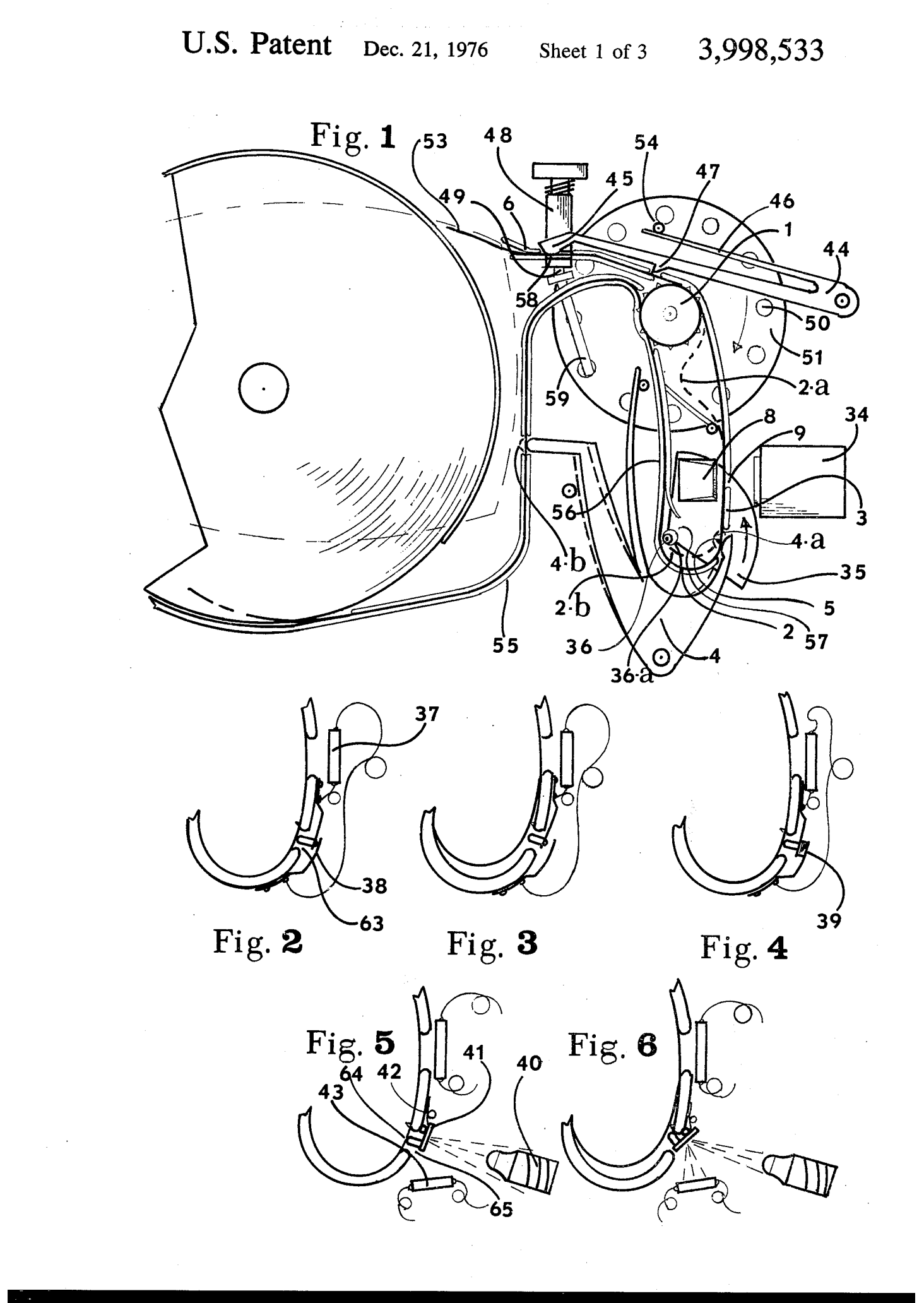

Referring to FIG. 1, a combined pin registration transport and shutter mechanism constructed in accordance with the present invention is shown as comprising input film guides 6, a sprocket wheel 1 driven by a pulley 51, a gate 3 having an aperture 9 provided therein, a film registration pin 5 provided in the gate below the aperture, return guide members 2 and an exit guide member 55. A mirror 8 is arranged to receive light from a source not shown, direct it through aperture 9 and a lens 34. A shutter mechanism shown generally at 57 comprises a member 35 mounted on a rotatable shaft 36a to rotate past mirror 8 to interrupt light directed through aperture 9 and lens 34. Shaft 36a is driven by a drive means, not shown, which can be of any conventional construction.

Extending from one end of shaft 36a in eccentric relationship with the axis thereof is a spindle 36 arranged to momentarily engage a film strip in the projector as it rotates with shutter member 35.

A film strip 53 is shown entering the film transport mechanism through input film guides 6, passing over sprocket wheel 1 in driven relationship therewith, proceeding down along gate past aperture 9 and registration pin 5, returning to the sprocket wheel through return guide members 56, and then exiting between exit guide members 55.

The film strip is driven through the projector by sprocket 1. As the sprocket drives the film, registration pin 5 will engage a perforation in the film and hold it stationary in the gate. Thus, continued driving of the film by sprocket 1 will cause a loop 2-a to form above the gate, and will cause loop 2-b provided downstream of the gate and pin, to shorten and move up toward spindle 36. Loop 2-b will continue to shorten until the film is engaged by the spindle whereupon the rotating spindle will exert a force on the loop, pulling the film off registration pin 5. When the film strip is released from the registration pin, spring forces inherent in loop 2-a will drive film through the gate until registration pin engages the next perforation in the film, in the conventional manner. Spindle 36 and member 35 are so arranged on shaft 36a that spindle 36 will engage the film strip just after member 35 has interrupted the light path to the mirror. Synchronization of the shutter with film transport is positive since the shutter directly initiates film transport.

An alternative embodiment of the present invention, shown in FIGS. 2 and 3 comprises use of an electronic shutter 37 in combination with the film transport mechanism described above. A slot 63 is provided in the gate below registration pin 5, and has a micro switch 38 provided therein which engages film as it passes along the gate. As the film is pulled off registration pin 5 for transport, switch 38 is allowed to open, (or close as in FIG. 3) whereupon an electric circuit will actuate electronic shutter 37, such as a Kerr Cell, PLZT wafer, liquid crystals or any other true electronic shutter device. When the film drops back into place on registration pin 5, switch 38 is moved back to its initial condition and shutter 37 reverts to transparency. Since the shutter only operates during transport, no light is lost during projection, as with conventional shutters.

FIG. 4 is an alternate to the micro switch device, comprising a piezo transducer 39, or any other self generating electrical device. The film applies the necessary pressure to activate the transducer which in turn actuates electronic shutter 37. When the film moves off the pin, the pressure is released, activating the transducer and activating the shutter.

FIGS. 5 and 6 show another alternative embodiment comprising a light source 40 and photo electric cell 43. Light from source 40 is focused on a mirror 41 which has a finger 64 which extends therefrom through an opening 65 in the gate and against any film strip in the gate. The finger is lightly biased against the film strip by a spring 42. As the film moves away from pin 5, mirror 41 is tilted by spring 42, focusing light from source 40 on photo cell 43, activating photo cell 43. The photo cell actuates the electronic shutter which becomes opaque during transport. Reseating of the film revolves mirror 41 deactivating the photo cell and returning electronic shutter to a transparent condition.

A film end stop means comprises a spring biased retainer 44, pivotally mounted on the projector frame and having a distal end 45 arranged to engage film in film guides 6 as it enters the projector. End 45 is spring biased against the film by a tine 46 engaged by a pin 54, and rides along edge of the film. As the end of the film leaves supply reel 17 and passes by end 45, end 45 will drop into an opening 58 provided in film guide 6. A tooth 47 provided on retainer 44 will then depend into a second opening in film guide 6 where it will engage a perforation in the film, and stop forward movement of film, preventing the tail end of the film from passing over sprocket 1 and completely on to a take-up reel, where it would then need to be "fished" out or rethreaded for rewinding. Simply reversing the direction of sprocket 1 will then rewind film back into the cartridge.

The projector of the present invention also provides for automatic still-frame showing at any point in the program by providing means 48 for coding and detecting any given frame of film as disclosed in U.S. Pat. No. 3,642,355. Upon detecting a notch in the film, as disclosed therein, a portion 49 of the notch detector means will drop into the notch, allowing a distal end 59 of the notch detector to drop into an indent 50 in pulley 51, stopping pulley 51, sprocket 1, and advance of film. Thereafter notch detector 49 may be released to continue showing of the next sequence.

The projector of the present invention also includes a novel film reel drive mechanism. Referring to FIG. 8, a spindle 16 is rotatably mounted on a drive shaft 12 by means of a bearing assembly 13, and is driven by a pulley 51, shown in FIG. 7. A double pawl 19 is disposed between two sections of spindle 16 for alternative driving of reels mounted on the respective sections. The pawl includes pawl members 19a and 19b resiliently hinged together on a pivot pin 14, shown in FIG. 9, which is eccentrically mounted on spindle 16. The pawl members have distal ends which are provided with flat faces 11 and sloped shoulders 10. Supply and take-up reels 17 and 18 are disposed on the two sections of spindle 16, respectively, and have notches 15 provided in their inner diameters adapted for engagement by pawl members 19a and 19b respectively.

Referring now to FIG. 9, since pawl members 19a and 19b are spring biased outwardly with respect to spindle 16. As drive shaft 12 rotates in the direction shown by the arrow, the distal end of pawl member 19b will rotate around the inner diameter of reel 17 until it encounters a notch 15, whereupon the end of the pawl will move into the notch until face 11 engages the sidewall of notch 15. Pawl member 19b will then drive reel 17 with drive shaft 12, as long as the drive shaft continues to turn in the direction of the arrow.

When the direction of rotation of drive shaft 12 reverses, the distal end of pawl member 19b will slide out of notch 15 along shoulder 10, and thereafter slide around the inner diameter of reel 17. At the same time, the distal end of pawl member 19a will slide around the inner diameter of reel 18 until it encounters a notch 15 provided therein, whereupon the face of the distal end of pawl member 19a will move into engagement with the side wall of notch 15 and drive reel 18 in the like manner as previously described.

Accordingly, the drive mechanism allows supply and take-up reels 18 and 17 to be coaxially mounted on a single drive shaft and alternatively driven in opposite directions simply by driving the drive shaft in opposite directions.

The present invention also provides a unique film cartridge for retaining a reel of film whereby the end of the film strip disposed thereon will be ready for immediate feeding into a self threading film projector. Referring to FIG. 10, a film cartridge constructed in accordance with the present invention includes a case 25, a cover 24 hingedly mounted on the case to complete a closure therewith.

Mounted within the case is a film strip guide means comprising elongated guide members 22 and 26, the outer one of which may also serve as one edge of case 25. Guide members 22 and 26 serve to guide a film strip from a reel disposed within the cartridge, to an exit slot 23 arranged to register with the input to the gate of a projector on which the cartridge is employed.

If during projection, the tail end of the film leaves the cartridge and enters projector, retainer 44 will catch and hold the tail end of the film. subsequent reversing of sprocket 1 will then feed film back into cartridge, depressing sensor 29, along film guies 22 and 26, and thence on around the inner guide where rapidly spinning reel 18 will draw film into the center for rewinding.

Pivotally mounted within case 25 by means of a pivot pin 3, a slot 60 and a spring 21 disposed within the slot, is a film retainer 28 having a tooth 30 disposed immediately below a slot 61 in the film guide members. Retainer 28 has a distal end 29 which projects toward the film strip path immediately adjacent exit slot 23, and is biased theretoward by a tine 32 extending from retainer 28 and engaged by a peg 33 mounted in case 25.

Retainer 28 serves to retain the end of film strip 53 immediately adjacent exit slot 23 when the film is being rewound onto a supply reel disposed in the cartridge, whereby film strip 53 will be ready for immediate insertion into a projector at the next desired projection of the film. As the film is being rewound into the cartridge, the distal end of the retainer will be urged against the underside of the film by resilient tine 32. As soon as the end of the film strip is withdrawn into the cartridge past the distal end of the retainer, the end of the retainer will be allowed to move upward into the path of the film strip. This will cause retainer 28 to pivot under the urging of tine 32 until tooth 30 engages the underside of the film strip. The film strip will then slide over the end of tooth 30 until the next perforation in the film registers with the tooth, whereupon retainer 28 will pivot further under the force of tine 32, moving tooth 30 into the perforation. Further movement of the film through the film guide members and onto the reel disposed in the cartridge will stop. Thus the end of the film strip will be retained in the cartridge just inside exit slot 23.

As has been noted, retainer 28 is mounted on pin 31 by means of a slot 60 and a compression spring 21 disposed within the slot. When tooth 30 catches a perforation in the film while the film is moving at high speed during rewinding, compression spring 21 absorbs the shock of the stopping of the film, preventing tearing of the film perforations.

A finger slot 27 is provided in the end of guide member 26 whereby, when it is desired to feed the film strip out of the cartridge and into the gate of a projector, the film strip may be engaged by a finger and urged through slot 23. Upon manual movement of the film strip toward slot 23, the film strip will exert forces on the sloping surfaces of tooth 30 and distal end 29 of retainer 28 effective to pivot the retainer against the force of tine 32 whereby the tooth and distal end of the retainer will move out of the path of the film strip, allowing the film strip to move into the projector gate.

FIG. 11 shows an alternate design of the film retainer. Retainer 28' has a series of rubber teeth 30a, provided thereon in place of tooth 30. These rubber teeth are designed to catch and stop the film by friction, thus absorbing the shock of a sudden stop. When distal end 29 moves upward, tine 32 thrusts rubber teeth 30a against the surface of the moving film. The teeth grip the film and bend backwards, creating a wedge effect at a point just above pivot point 31, and firmly restraining movement of the film.

FIG. 11 also illustrates how various capacity cartridges adapt to a single projector since spindle 16 and exit slot 23 have the same relationship in cartridges of different sizes.

While preferred embodiments of the invention have been illustrated and described, it should be understood that the invention is not intended to be limited to these embodiments, but rather is defined by the accompanying claims.

What is claimed is:

1. A film projector comprising a gate, means forming an aperture in the gate, means forming a light path through the aperture and through film disposed in the gate, drive means for driving film through the gate and transporting film past the aperture, registration pin means for engaging perforations in the film driven through the gate to intermittently hold the film motionless with respect to the aperture, the drive means and registration pin means together providing intervals during which the film is transported past the aperture alternating with intervals during which the film is held motionless with respect to the aperture, shutter means for interdicting the light path, means for driving the shutter means independently of the speed of transport of the film past the apertue and independently of the length of the interval during which the film is held motionless with respect to the aperture, and synchronizing means for positively synchronizing the shutter means with transport of the film past the aperture, wherein said shutter means comprises an electronic shutter and said synchronizing means comprises detector means for operating said electronic shutter upon detecting movement of film off the registration pin.

2. The film projector described in claim 1 wherein the detector means comprises a finger lightly spring biased to bear against film adjacent the registration pin and switch means operable by movement of the finger whereby when film moves off the registration pin the finger will move with it sufficiently to operate said switch means which in turn will actuate the electronic shutter.

3. The invention of claim 2 wherein the switch means comprises a pressure sensitive transducer.

4. The invention of claim 2 wherein the switch means comprises, a light source, a photoelectric cell, and a mirror mounted for movement with the finger to direct light from the light source to the photoelectric cell upon movement of the finger.

5. A film projector comprising a gate, means forming an aperture in the gate, means forming a light path through the aperture and through film disposed in the gate, drive means for driving film through the gate and transporting film past the aperture, registration pin means for engaging perforations in the film driven through the gate to intermittently hold the film motionless with respect to the aperture, the drive means and registration pin means together providing intervals during which the film is transported past the aperture alternating with intervals during which the film is held motionless with respect to the aperture, shutter means for interdicting the light path, means for driving the shutter means independently of the speed of transport of the film past the aperture and independently of the length of the interval during which the film is held motionless with respect to the aperture, and synchronizing means for positively synchronizing the shutter means with transport of the film past the aperture, wherein said shutter means comprises a thin vane mounted on a rotating shaft for rotation through said light path, and said synchronizing means comprises an eccentric member mounted in rotating relationship with said rotating shaft, and which is movable in response to rotation of said shutter member through the light path to engage film in the gate and disengage it from the registration pin whereby the film will transport, and further comprising means defining a variable, looping film path downstream of the registration pin, and wherein the drive means is arranged to drive a filmstrip both upstream and downstream of the gate, whereby a filmstrip in the gate will form a loop below the registration pin that will become progressively tighter as the drive means drives the filmstrip downstream of the gate, and wherein said eccentric spindle member is disposed in said variable film path, and wherein the eccentric spindle member is disposed in the film path downstream of the registration pin at a predetermined point whereby a tightening loop of film will move into engagement therewith and upon further tightening of the filmstrip against the rotating eccentric spindle it will be pulled off the registration pin as the shutter rotates with the spindle past the aperture.

6. A method of transporting film in a projector having a gate, means forming an aperture in the gate, means defining a light path through the aperture, film driving means and shutter means for interrupting the light path comprising, driving perforated film into and out of the gate, preventing movement of film in the gate in registration with the aperture by engaging a perforation in the film with a pin adjacent the aperture, forming an expanding loop in the film upstream of the gate by continued driving of the film upstream of the gate, forming a contracting loop in the film downstream of the gate by continued driving of the film downstream of the gate, disengaging the film from the registration pin and allowing film in the gate to transport under the forces inherent in the expanding loop upstream of the gate until the registration pin registers with the next successive perforation in the film and actuating the shutter means during transport of the film past the aperture at a speed that is independent of the speed of driving the film through the gate, and wherein the shutter means comprises eccentric spindle means disposed for engagement by the contracting loop downstream of the gate, and wherein the method further comprises pulling the contracting loop against the eccentric spindle until it is sufficiently displaced by rotating of the eccentric spindle to pull the filmstrip off the pin.

* * * * *